US009002517B2

(12) United States Patent
Bosscher et al.

(10) Patent No.: US 9,002,517 B2
(45) Date of Patent: Apr. 7, 2015

(54) TELEMATIC INTERFACE WITH DIRECTIONAL TRANSLATION

(71) Applicant: Harris Corporation, Melbourne, FL (US)

(72) Inventors: Paul M. Bosscher, West Melbourne, FL (US); Matthew D. Summer, Melbourne, FL (US); Loran J. Wilkinson, Palm Bay, FL (US); William S. Bowman, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/494,635

(22) Filed: Sep. 24, 2014

(65) Prior Publication Data

US 2015/0057803 A1 Feb. 26, 2015

Related U.S. Application Data

(62) Division of application No. 13/009,019, filed on Jan. 19, 2011, now Pat. No. 8,918,214.

(51) Int. Cl.
*G05B 15/00* (2006.01)
*B25J 13/02* (2006.01)
(Continued)

(52) U.S. Cl.
CPC ............ *B25J 13/025* (2013.01); *G06F 3/017* (2013.01)

(58) Field of Classification Search
CPC .... B25J 9/1986; B25J 9/1633; B62D 57/032; A61B 19/2203; A61B 2009/2223
USPC .......................................... 700/260, 245, 248
See application file for complete search history.

(56) References Cited

U.S. PATENT DOCUMENTS

| 3,280,991 A | 10/1966 | Melton |
| 3,637,092 A | 1/1972 | George et al. |

(Continued)

FOREIGN PATENT DOCUMENTS

| EP | 0672507 A1 | 9/1995 |
| EP | 1 876 505 A1 | 1/2008 |

(Continued)

OTHER PUBLICATIONS

Information about Related Patents and Paten Applications, see section 6 of the accompanying Information Disclosure Statement Letter, which concerns Related Patents and Patent Applications.

(Continued)

*Primary Examiner* — Ian Jen
(74) *Attorney, Agent, or Firm* — Robert J. Sacco, Esq.; Fox Rothschild LLP (57) ABSTRACT

Method and system for telematic control of a slave device. Displacement of a user interface control is sensed with respect to a control direction. A first directional translation is performed to convert data specifying the control direction to data specifying a slave direction. The slave direction will generally be different from the control direction and defines a direction that the slave device should move in response to the physical displacement of the user interface. A second directional translation is performed to convert data specifying haptic sensor data to a haptic feedback direction. The haptic feedback direction will generally be different from the sensed direction and can define a direction of force to be generated by at least one component of the user interface. The first and second directional translation are determined based on a point-of-view of an imaging sensor.

15 Claims, 7 Drawing Sheets

(51) Int. Cl.
*G06F 3/01* (2006.01)
*G05B 19/00* (2006.01)

(56) References Cited

U.S. PATENT DOCUMENTS

| | | | |
|---|---|---|---|
| 4,216,467 A | 8/1980 | Colston | |
| 4,521,685 A | 6/1985 | Rebman | |
| 4,604,016 A | 8/1986 | Joyce | |
| 4,655,673 A | 4/1987 | Hawkes | |
| 4,661,032 A | 4/1987 | Arai | |
| 4,762,006 A | 8/1988 | Asakawa et al. | |
| 4,791,588 A | 12/1988 | Onda et al. | |
| 4,795,296 A | 1/1989 | Jau | |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,981 A | 1/1990 | Yoshinada et al. | |
| 4,975,856 A | 12/1990 | Vold et al. | |
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,184,319 A | 2/1993 | Kramer | |
| 5,193,963 A | 3/1993 | McAffee et al. | |
| 5,231,693 A | 7/1993 | Backes et al. | |
| 5,382,885 A | 1/1995 | Salcudean et al. | |
| 5,413,454 A | 5/1995 | Movsesian | |
| 5,430,643 A | 7/1995 | Seraji | |
| 5,451,924 A | 9/1995 | Massimino et al. | |
| 5,508,596 A | 4/1996 | Olsen | |
| 5,565,891 A | 10/1996 | Armstrong | |
| 5,589,828 A | 12/1996 | Armstrong | |
| 5,619,180 A | 4/1997 | Massimino et al. | |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A * | 11/1998 | Jacobus et al. | 318/568.11 |
| 6,028,593 A * | 2/2000 | Rosenberg et al. | 345/156 |
| 6,047,610 A * | 4/2000 | Stocco et al. | 74/479.01 |
| 6,084,587 A * | 7/2000 | Tarr et al. | 345/419 |
| 6,088,017 A * | 7/2000 | Tremblay et al. | 345/156 |
| 6,104,158 A | 8/2000 | Jacobus et al. | |
| 6,178,775 B1 | 1/2001 | Higginbotham et al. | |
| 6,184,868 B1 | 2/2001 | Shahoian et al. | |
| 6,191,796 B1 * | 2/2001 | Tarr | 345/581 |
| 6,246,390 B1 | 6/2001 | Rosenberg | |
| 6,271,833 B1 * | 8/2001 | Rosenberg et al. | 345/161 |
| 6,281,651 B1 * | 8/2001 | Haanpaa et al. | 318/568.11 |
| 6,522,952 B1 | 2/2003 | Arai et al. | |
| 6,535,793 B2 | 3/2003 | Allard | |
| 6,592,315 B2 | 7/2003 | Osborne, Jr. | |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 | 9/2004 | Sanchez et al. | |
| 6,801,008 B1 | 10/2004 | Jacobus et al. | |
| 6,857,878 B1 | 2/2005 | Chosack et al. | |
| 7,138,981 B2 | 11/2006 | Kim et al. | |
| 7,158,112 B2 | 1/2007 | Rosenberg et al. | |
| 7,168,748 B2 | 1/2007 | Townsend et al. | |
| 7,208,900 B2 | 4/2007 | Carlson et al. | |
| 7,225,404 B1 * | 5/2007 | Zilles et al. | 715/701 |
| 7,345,672 B2 | 3/2008 | Jacobus et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 | 4/2011 | Sjoberg et al. | |
| 8,226,072 B2 | 7/2012 | Murayama | |
| 8,373,391 B1 | 2/2013 | Allen et al. | |
| 8,447,440 B2 | 5/2013 | Phillips et al. | |
| 8,473,101 B2 | 6/2013 | Summer | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 | 12/2004 | Riener et al. | |
| 2005/0087373 A1 | 4/2005 | Wakitani et al. | |
| 2005/0252329 A1 | 11/2005 | Demers | |
| 2006/0048364 A1 | 3/2006 | Zhang et al. | |
| 2006/0066574 A1 | 3/2006 | Kim et al. | |
| 2006/0117258 A1 | 6/2006 | Yu | |
| 2006/0178775 A1 | 8/2006 | Zhang et al. | |
| 2007/0013336 A1 | 1/2007 | Nowlin et al. | |
| 2007/0050139 A1 | 3/2007 | Sidman | |
| 2007/0095582 A1 | 5/2007 | Stuijt et al. | |
| 2008/0009971 A1 | 1/2008 | Kim et al. | |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 | 3/2009 | Dariush et al. | |
| 2009/0182436 A1 | 7/2009 | Ferrara | |
| 2009/0234499 A1 | 9/2009 | Nielsen et al. | |
| 2010/0019890 A1 | 1/2010 | Helmer et al. | |
| 2010/0023185 A1 | 1/2010 | Terwelp et al. | |
| 2010/0041991 A1 * | 2/2010 | Roundhill | 600/443 |
| 2010/0070079 A1 | 3/2010 | Mangaser et al. | |
| 2010/0084513 A1 | 4/2010 | Gariepy et al. | |
| 2010/0092267 A1 | 4/2010 | Najdovski et al. | |
| 2010/0100256 A1 * | 4/2010 | Jurmain et al. | 701/2 |
| 2010/0168918 A1 | 7/2010 | Zhao et al. | |
| 2010/0169815 A1 | 7/2010 | Zhao et al. | |
| 2010/0172733 A1 | 7/2010 | Chalubert et al. | |
| 2010/0259614 A1 | 10/2010 | Chen | |
| 2011/0015569 A1 | 1/2011 | Kirschenman et al. | |
| 2011/0046781 A1 | 2/2011 | Summer | |
| 2011/0106339 A1 | 5/2011 | Phillips et al. | |
| 2011/0144828 A1 | 6/2011 | Chengalva | |
| 2011/0155785 A1 | 6/2011 | Laurent et al. | |
| 2011/0257786 A1 | 10/2011 | Caron L'Ecuyer et al. | |
| 2012/0095619 A1 | 4/2012 | Pack et al. | |
| 2012/0150351 A1 | 6/2012 | Bosscher et al. | |
| 2012/0184955 A1 | 7/2012 | Pivotto et al. | |
| 2012/0185098 A1 | 7/2012 | Bosscher et al. | |
| 2012/0185099 A1 * | 7/2012 | Bosscher et al. | 700/264 |
| 2012/0294696 A1 | 11/2012 | Summer et al. | |
| 2012/0306741 A1 | 12/2012 | Gupta | |
| 2013/0328770 A1 | 12/2013 | Parham | |
| 2014/0031983 A1 * | 1/2014 | Low et al. | 700/257 |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 A1 | 7/2003 |
| WO | 2006 016799 A1 | 2/2006 |
| WO | 2007051000 A2 | 5/2007 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

European Search Report mailed Mar. 14, 2012, Application Serial No. 11009319.2-2316, in the name of Harris Corporation.
International Search Report mailed May 23, 2012; Application Serial No. PCT/US2011/066873 in the name of Harris Corporation.
International Search Report mailed Jun. 28, 2012, Application Serial No. PCT/US2012/027475 in the name of Harris Corporation.
International Search Report dated Oct. 29, 2012; Application Serial No. PCT/US2012/034207 in the name of Harris Corporation.
International Search Report dated Jan. 15, 2013, Application Serial No. PCT/US2012/037751 in the name of Harris Corporation.
International Search Report mailed Jan. 4, 2013, International Application Serial No. PCT/US2012/058303 in the name of Harris Corporation.
International Search Report mailed May 2, 2013, International Application No. PCT/US2012/051314, in the name of Harris Corporation.

(56) References Cited

OTHER PUBLICATIONS

International Search Report mailed May 12, 2014, Applicaiton Serial No. PCT/US2013/069071, in the name of Harris Corporation.
Alqasemi, R., et al., "Maximizing Manipulation Capabilities for People with Disabilities Using 9-DoF Wheelchair-Mounted Robotic Arm System", 2007, IEEE.
Alqasemi R et al: "Kinematics, control and redundancy resolution of a 9-DoF wheelchair-mounted robotic arm system for ADL tasks", Mechatronics and Its Applications, 2009. ISMA '09. 6th International Symposium on, IEEE, Piscataway, NJ, USA, Mar. 23, 2009, pp. 1-7
Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796
Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.
Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.
Hamid Abdi et al: "Joint Velocity Redistribution for Fault Tolerant Manipulators", Robotics Automation and Mechatronics (RAM), 2010 IEEE Conference on, IEEE, Piscataway, NJ, USA, Jun. 28, 2010, pp. 492-497, XP031710198.
Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, USA, IEEE, US, vol. 2, 4, Nov. 1996, pp. 425-430, XP010212433.
Marshall, W.C., et al., "A Testbed for Deisgn of User-Friendly, Multiple-Degree-of-Freedom, Manual Controllers", Scientific Honeyweller, Honeywell's Corporate. Minneapolis, US Jan. 1, 1993, pp. 78-86.
Rocco, Ana Catalina Torres, Development and testing of a new C-based algoithm to control a 9-degree-of-freedom wheelchair-mounted-robotic-arm system, University of South Florida, Jun. 1, 2010.
Rogers, JE., et al., "Bi-directional Gap Closing MEMS Actuator Using Timing and Control Techniquest", IEEE Industrial Electronics, IECON 2006—32nd Annual Conference on, IEEE, Piscataway, NJ USA Nov. 1, 2006, pp. 3469-3154.
Suzuki, A., et al., "Performance conditioning of time delayed bilaterial teleoperation system by scaling down compensation value of communication disturbance observer", Advanced Motion Control, 2010, 11th IEEE International Conference on, IEEE, Piscataway, NJ, USA, Mar. 12, 2010, pp. 524-529.
Tas, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.
Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.
Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.
Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tomorrow, IEEE—Piscataway, NJ, USA, Piscataway, NJ, USA, May 19, 2008, pp. 212-219.
Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

\* cited by examiner

TELEMATIC INTERFACE WITH DIRECTIONAL TRANSLATION

CROSS REFERENCE TO RELATED APPLICATION

This application is a divisional application of and claims priority to co-pending non-provisional U.S. patent application Ser. No. 13/009,019 filed on Jan. 19, 2011, which is hereby incorporated by reference in its entirety.

STATEMENT OF THE TECHNICAL FIELD

The inventive arrangements relate to robot methods and systems, and more particularly to telematic controls for such systems.

DESCRIPTION OF THE RELATED ART

Simple user interface systems can provide a separately operable control for each movable joint of a robot or robotic manipulator. More complex systems can include hand controllers (sometimes in the form of a pistol grip), which sense the movement by a user's hand. The hand controller generates one or more control signals which are then used for actuating various motion operations of the robot. The control system of the robot will respond to these control signals by activating certain servo-motors, solenoids, or other devices within the robotic manipulator to produce the desired action.

An imaging sensor, such as a video camera, can be used to provide visual information to a remote operator regarding a work piece and/or the environment surrounding the robotic manipulator. In such applications, the imaging sensor is mounted at one or more locations on the robot and/or on a robotic manipulator arm. In a system involving a robotic manipulator arm attached to an unmanned ground vehicle (UGV), imaging sensors can be provided at one or more points on the body of the UGV, mounted to a robotic arm attached to the UGV, and adjacent to a grasping device associated with the robotic arm. An operator may choose to view at a remote display monitor a video feed associated with a particular one of these imaging sensors providing a view that is most helpful for a given task.

Haptic technology or haptics involves tactile feedback provided by a device to a user. The tactile feedback is typically provided by applying forces, vibrations and/or motions to one or more portions of a user interface device. Haptics are sometimes used to enhance remote control devices associated with machines and devices. For example, U.S. Pat. No. 5,831,408 to Jacobus et al. discloses that force feedback systems are sometimes used to communicate forces generated on a robotic hand back to a user, through a hand controller. If the robotic hand impacts an object, the impact is felt by the user's hand.

SUMMARY OF THE INVENTION

The invention concerns a method and system for telematic control of a slave device. A physical displacement of a user interface control is sensed with respect to a control direction. The control direction can be any direction that is useful for changing a pose of a slave device, such as a robot arm. As such, the control direction can include linear directions defined with respect to as many as three orthogonal linear axes, and rotational directions defined as many as three rotational axes. In some embodiments, the linear and rotational axes can be aligned. A first directional translation converts data specifying the control direction to data specifying a slave direction. The slave direction is generally different from the control direction and defines a direction that the slave device should move in response to the physical displacement of the user interface. As with the control direction, the slave direction can generally include linear directions defined with respect to as many as three orthogonal linear axes, and rotational directions defined as many as three rotational axes.

The first directional translation is determined based on a point-of-view of an imaging sensor associated with the slave device. For example, the imaging sensor can be mounted to a portion of the slave device. The imaging sensor point-of-view information is determined based upon a position and/or an orientation of the imaging sensor. For example, in some embodiments, the orientation of the imaging sensor can vary about as many as three orthogonal axes of rotation (e.g. pitch, roll, and yaw). In some embodiments, the point-of-view can be determined based on a sensed position of one or more movable joints comprising the slave unit.

The method also includes automatically dynamically modifying the first directional translation that is performed when the point-of-view is modified. The directional translation can include linear and rotational translation. Imaging sensor point-of-view can be modified by changing the position or orientation of a imaging sensor. Imaging sensor point-of-view can also be modified in response to a user selection of an image obtained from a second imaging sensor in place of the first imaging sensor, where the second imaging sensor has a different point-of-view as compared to the first imaging sensor.

The slave device includes a robotic arm having a plurality of joints for facilitating movement of a portion of the robotic arm in the slave direction responsive to the user interface control. As noted above, the user interface control can be arranged to measure a control input with as many as six degrees of freedom for controlling a pose of the robotic arm. In some embodiments, a mounting point for the imaging sensor moves with the robotic arm, such that the point-of-view of the imaging sensor changes concurrently with movement of the robotic arm.

One or more sensors associated with the slave device are also used to generate a signal representing a force applied to the slave device in a sensed direction. The sensed direction can include linear forces defined with respect to as many as three orthogonal linear axes, and rotational forces or torques defined with respect to as many as three rotational axes. Consequently, a second directional translation can be performed to convert data specifying the sensed direction to data specifying a haptic feedback direction. The second directional translation can include directional translation of forces defined with respect to the one or more linear axes, and/or forces defined with respect to the one or more rotational axes. The resulting haptic feedback direction will generally be different from the sensed direction and can define a direction of force to be generated by at least one component of the user interface. Significantly, the second directional translation is also determined based on a point-of-view of a imaging sensor used to visualize the operations of the robot slave device.

The method also includes automatically dynamically modifying the second directional translation that is performed when the point-of-view is modified. Data representing at least one of the sensed direction and the haptic feedback direction is communicated to the user interface to generate a linear or rotational force using at least one component of the user interface.

A robot system is also provided for implementing the method described above. The robot system includes a control interface having at least one sensor for sensing a displacement of a user interface control in any linear control direction defined with respect to a three-dimensional set of coordinate axes. The user interface can also include at least one sensor for sensing a displacement of the user interface in any rotational control direction defined with respect to as many as three orthogonal axes of rotation. Accordingly, the user interface is configured for sensing user control inputs with as many as six degrees of freedom. A slave device is also provided. The slave device is configured for moving in response to control signals generated at the control interface. For example, the slave device can be configured to move with as many as six degrees of freedom in response to signals from the user interface.

A control processor is coupled to the control interface and configured to perform a first directional translation. The directional translation involves converting data specifying the control direction to data specifying a slave direction, which is different from the control direction. The directional translation can include linear translation and rotational translation. The slave direction defines the direction that the slave device should move in response to the physical displacement of the user interface. The first directional translation can be determined based on a point-of-view of a first imaging sensor mounted to a portion of the slave device. The control processor can also be configured for automatically dynamically modifying the first directional translation that is performed when the point-of-view is modified. In some embodiments, the control processor is advantageously configured to determine the point-of-view based on information obtained from one or more position sensors. The control processor can also be configured to automatically dynamically modify the first directional translation in response to a user input. For example, the user input can include selecting an image obtained from a second imaging sensor in place of the first imaging sensor, where the second imaging sensor has a different point-of-view as compared to the first imaging sensor.

At least one sensor associated with the slave device generates a signal representing a force applied to the slave device in a sensed direction. The control processor is programmed for performing a second directional translation to convert data specifying the sensed direction to data specifying a haptic feedback direction. The directional translation is determined based on the point-of-view of the first imaging sensor so that the haptic feedback direction is different from the sensed direction. At least one haptic force generator at the user interface is responsive to the control processor. Such haptic force generator is configured for generating a haptic force aligned with the feedback direction. The control processor in such embodiments is configured to automatically dynamically modify the second directional translation that is performed when the point-of-view is modified. The point-of-view can be modified by a change of imaging sensor position/orientation. However, the control processor can also be programmed such that the second directional translation is automatically modified in response to a user input selection of an image obtained from a second imaging sensor in place of the first imaging sensor, where the second imaging sensor has a different point-of-view as compared to the first imaging sensor.

BRIEF DESCRIPTION OF THE DRAWINGS

Embodiments will be described with reference to the following drawing figures, in which like numerals represent like items throughout the figures, and in which.

DETAILED DESCRIPTION

The present invention is described with reference to the attached figures, wherein like reference numbers are used throughout the figures to designate similar or equivalent elements. The figures are not drawn to scale and they are provided merely to illustrate the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

When a robotic manipulator is operated at a location remote from a user, one or more imaging sensors are often used to provide visual information to the operator regarding a work piece and/or the environment surrounding the robotic manipulator. At a remote display monitor, an operator may choose to view an image associated with or generated by the imaging sensor that is most helpful for a given task. The present invention concerns robotic manipulator systems and robot manipulator control systems in which control signals that are communicated to a robotic manipulator are automatically modified in response to variations in position and/or orientation of a imaging sensor providing an image used for controlling the robot manipulator. The position and orientation of the imaging sensor define the imaging sensor's point-of-view. The term "orientation" as used herein can include variations in sensor rotation around as many as three orthogonal axes of rotation (e.g. pitch, roll, and yaw). A different imaging sensor point-of-view can result from the same imaging sensor being moved to a different position or rotated to a different orientation. For example, this can occur when the imaging sensor is attached to a movable robotic manipulator arm. Alternatively, the imaging sensor point-of-view can change due to a user input selection of a image feed from a first imaging sensor, and a subsequent user input selection of a image feed for a second imaging sensor, where the first imaging sensor and the second imaging sensor have different orientations and/or different relative positions. Note that the image displayed to the user can be a still image or a video image.

If a user interface is to operate in a natural or intuitive way, then operator initiated forces applied to the interface control will ideally correspond to a reference direction associated with the video image appearing on the display screen. For example, consider the situation where a distal end of a robotic arm appears in a center of a video image display screen, and an operator wishes the distal end to move in a downward direction, toward the bottom of the image displayed on the screen. In such a scenario, the desired downward motion of the distal end of the robotic arm is ideally obtained by a corresponding downward motion applied to a user interface control. When the displayed image, the motion of the robotic manipulator, and the control interface are all coordinated in this way, the operation of the robotic arm will be most natural for the operator, and the system will be most easily controlled.

Still, there are problems that occur when attempting to implement a system which operates as previously described. For example, when a video image is obtained from an imaging sensor having a first position and orientation, the operator may conclude that in order to move the distal end of a robotic arm in a first desired direction, a user interface control needs to move in a direction which is toward the display screen on which the image is displayed. However, the operator's sense of which direction to move the controller is based on the point-of-view of the imaging sensor. If the imaging sensor has a different point-of-view, then it may appear to the operator that a different set of user inputs are necessary. The problem is that the frame of reference utilized by the operator is variable depending upon the point-of-view of the imaging sensor.

As used herein, the phrase "frame of reference" refers to a three dimensional coordinate system which is generally defined based on an orientation of an image in a display unit, where the image is provided by an imaging sensor having a particular point-of-view. Within a particular frame of reference, relative directional terms such as up, down, left, and right can have well understood meanings. For example, the relative directional terms up, down, left, right can be generally understood as corresponding to the top, bottom, left and right sides of an image presented on a screen of a display unit. Forward can be understood as the direction toward the screen. Reverse or backward can be understood as the direction away from the screen. Notably, the frame of reference and associated coordinate system can change as a result of a change in imaging sensor position and/or orientation.

Similarly, within a particular frame of reference, relative directional terms such as clockwise rotation and counterclockwise rotation can have well understood meanings In the same way, rotation of the user interface control can have an intuitive meaning for the user with respect to as many as three different axes of rotation. However, these directions are intuitively meaningful to the user only with respect to the frame of reference that the user observes on the screen, which is of course a function of imaging sensor position and/or orientation.

Figure 1A:
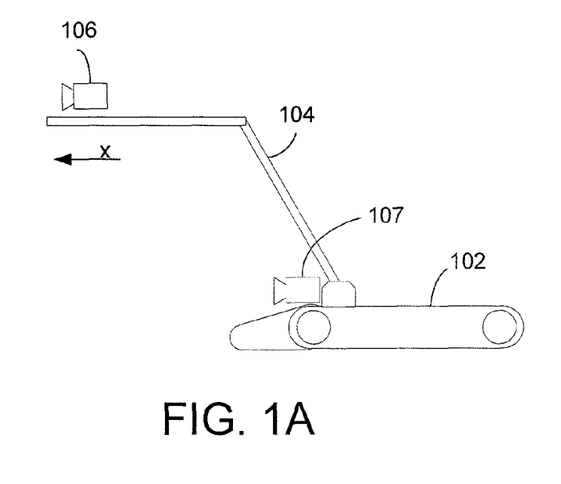
FIGS. 1A and 1B (collectively referred to as FIG. 1) provide drawings showing a robot and associated control system that is useful for understanding the invention.
Figure 1B:
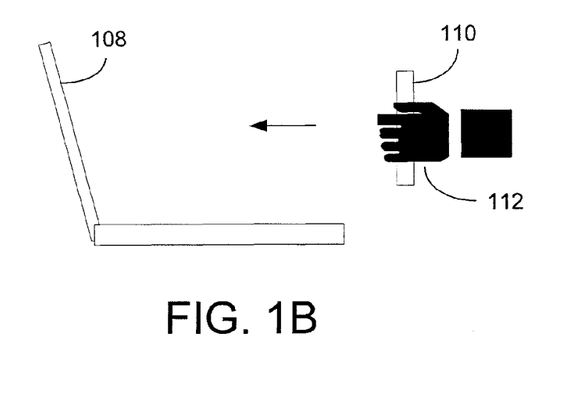
Figure 2A:
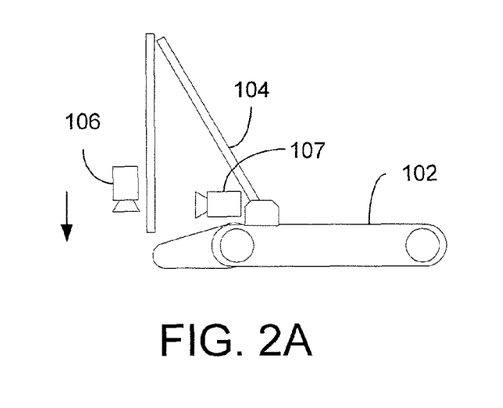
FIGS. 2A and 2B (collectively referred to as FIG. 2) provide drawings showing a robot and associated control system that is useful for understanding the invention.
Figure 2B:
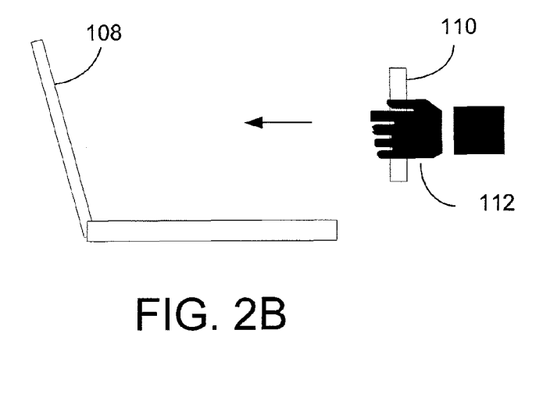

The control problem relating to imaging sensor point-of-view and operator frame of reference can be more readily understood by referring to FIGS. 1 and 2. FIGS. 1A and 2A show a UGV 102 with a robot arm 104 and an imaging sensor 106. The imaging sensor can include any device that converts an optical image to an electric signal. For example, the imaging sensor can include devices that use video camera tubes, charge coupled devices, or a complementary metal-oxide-semiconductor (CMOS) active pixel sensors, without limitation, to convert an optical image to an electric signal. The imaging sensor can also include devices that perform thermal imaging, multi-spectral imaging, gamma cameras, and sensor arrays for x-rays. In some embodiments, the imaging sensor 106 can be a video camera, but the invention is not limited in this regard. In FIGS. 1B and 2B respectively there is shown a display unit 108 which can display a video image obtained from the imaging sensor 106. For example, the display unit 108 can be a laptop computer. A hand control 110 senses linear and rotational input control motions of a user 112 and communicates user input signals to a control system (not shown). In response, the control system communicates control signals to the UGV for controlling the movement of the robot arm.

In FIG. 1A, with the imaging sensor 106 mounted as shown, an operator wishes to move the distal end of the robotic arm in the x direction shown by the arrow. With the imaging sensor 106 positioned and oriented as shown, the x direction is forward in the image as observed by the operator on the display unit 108. Thus, it would be natural for the operator to expect that pushing a hand control 110 forward (toward the image) would move the distal end of the arm in the x direction. This motion of the hand control 110 is illustrated by the arrow in FIG. 1B.

However, consider now the situation shown in FIG. 2A. In FIG. 2A, an operator is again observing a video output of imaging sensor 106 and wishes to move the distal end of the robotic arm 104 in the y direction shown by the arrow. With the imaging sensor 106 oriented as shown, the y direction is forward in the image observed by the operator on the video display 108. Accordingly, it would be natural for the operator to expect that pushing the hand control 110 in the forward direction (toward the displayed image) would move the distal end of the robotic arm 104 in the y direction. This motion of the hand controller 110 is shown in FIG. 2B. Notice that in each of these two situations, the operator will naturally move his hand in the same direction as shown in FIGS. 1B and 2B, but the actual motions desired in FIGS. 1A and 2A are along two entirely different axes. This same problem can occur with respect to linear and rotational movements of the hand controller by the user.

Referring again to FIGS. 2A and 2B, it should be appreciated that the same problem as described above will also occur if an operator switches from imaging sensor 106 having a first point-of-view, to imaging sensor 107 having a different point-of-view. Consequently, in FIG. 2A, an operator viewing a work object in FIG. 2A, will have a different frame of reference depending on whether he is observing the work object using imaging sensor 106 as compared to imaging sensor 107.

A similar problem also occurs when haptic technology is incorporated into a control interface. Specifically, when the imaging sensor point-of-view changes, the direction of feedback forces applied by the haptic technology may no longer seem to be correctly aligned with respect to the operator's frame of reference as defined by the imaging sensor point-of-view. This will result in haptic feedback forces which provide a tactile experience to an operator that is inconsistent with the operator's frame of reference.

The present invention solves the foregoing problems by providing a control system which will automatically modify control signals that are communicated to a robotic manipulator. The control signals are modified in response to variations in an operator's frame of reference as defined by a imaging sensor point-of-view. Specifically, such frame of reference is based on the point-of-view of a imaging sensor which generates an image displayed to a control operator for purposes of controlling the robotic manipulator. In some embodiments, the control system will also automatically modify haptic control signals for providing operator feedback so that such haptic feedback correctly corresponds to the operator's frame of reference as defined by an imaging sensor point-of-view.

Figure 3:
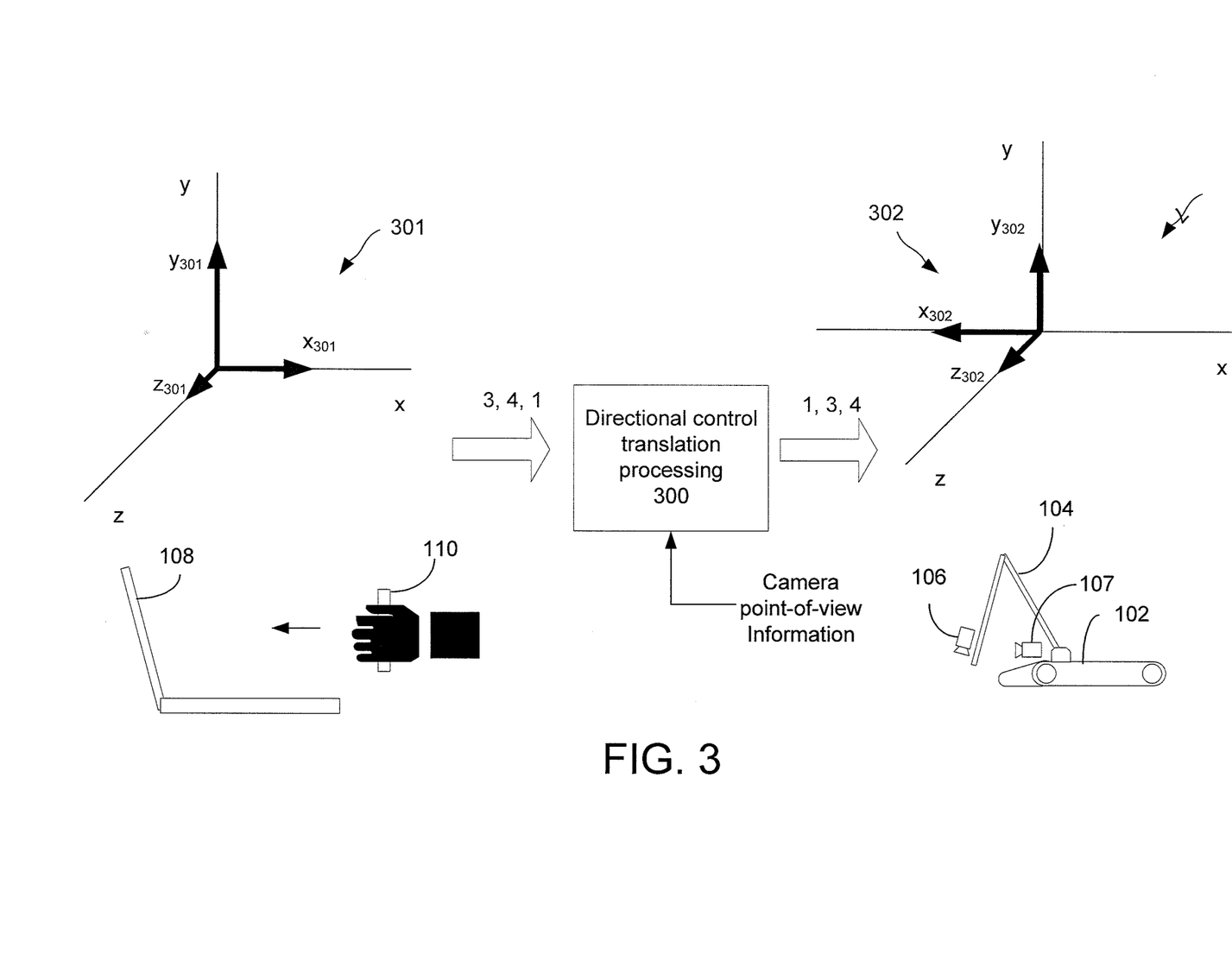
FIG. 3 is a conceptual drawing that is useful for understanding directional control translation processing.

Referring now to FIG. 3, a conceptual drawing is provided which is useful for understanding an embodiment of a robotic manipulator system and method according to the present invention. For the purposes of clarity in this example, the concept will be described exclusively with reference to linear control directions and rotational components are not shown; however, it should be understood that the invention is not limited in this regard.

In FIG. 3, a user moves a hand controller 110 to control a pose of robotic arm 104, which is mounted on UGV 102. In order to determine the movement that is required of the robotic arm 104, the operator relies on visual information (i.e. a video image obtained from imaging sensor 106) which is presented to the operator on display unit 108. However, the operator's frame of reference will vary with changes in the point-of-view of a imaging sensor 106. As explained above, such variations in frame of reference can result in the operator expecting the robotic arm to respond in different ways to the same input control motions. Accordingly, in the embodiment of the invention shown in FIG. 3, directional control translation processing 300 is performed so that robotic arm motions are made consistent with operator expectations.

In FIG. 3, when an operator manipulates hand controller 110, the direction of motion sensed by the motion of the hand controller is specified by one or more vector components defined with respect to coordinate axes x, y, z. These vector components are defined in coordinate system 301, as $x_{301}$, $y_{301}$, $z_{301}$. To facilitate understanding of the invention, rotational movement directions are omitted in FIG. 3; however, the invention is not limited in this regard.

The combination of the vector components $x_{301}$, $y_{301}$, $z_{301}$ define the direction of movement that the operator desires from the distal end of robotic arm 104. But note that the operator's sense of which direction the robotic arms needs to move is based on the operator's frame of reference. The operator's frame of reference is based on the image presented on display unit 108, and will vary depending on the point-of-view of the imaging sensor. Consequently, the input vector components $x_{301}$, $y_{301}$, $z_{301}$ sensed by the hand control 110 must be modified before they can be used to effect the desired motion of robotic arm 104. This modification involves a directional translation.

For the purposes of FIG. 3, it can be assumed that the coordinate systems 301, 302 are fixed with respect to the world. It can also be assumed that image sensor 106 is the source for images displayed on display unit 108, and the point of view of image sensor 106 thereby defines the frame of reference for the user. As a result of directional control translation processing 300, the input vector component set $x_{301}$, $y_{301}$, $z_{301}$ is translated to output vector component set $x_{302}$, $y_{302}$, $z_{302}$. Thus, the direction the robot arm is actually commanded to move can appear to have little relation to the motion sensed by the hand controller 110. Further, it should be noted that the specific directional translation performed will vary depending on input information which defines the imaging sensor point-of-view. In other words, the directional translation performed will be different depending on the point-of-view of the imaging sensor 106. Similarly, a different directional translation can be performed if the operator is utilizing imaging sensor 107 instead of imaging sensor 106. In either case, it should be understood that while only linear directional translation is illustrated in FIG. 3, the present invention is intended to include translation of linear and rotational motion commands.

Figure 4:
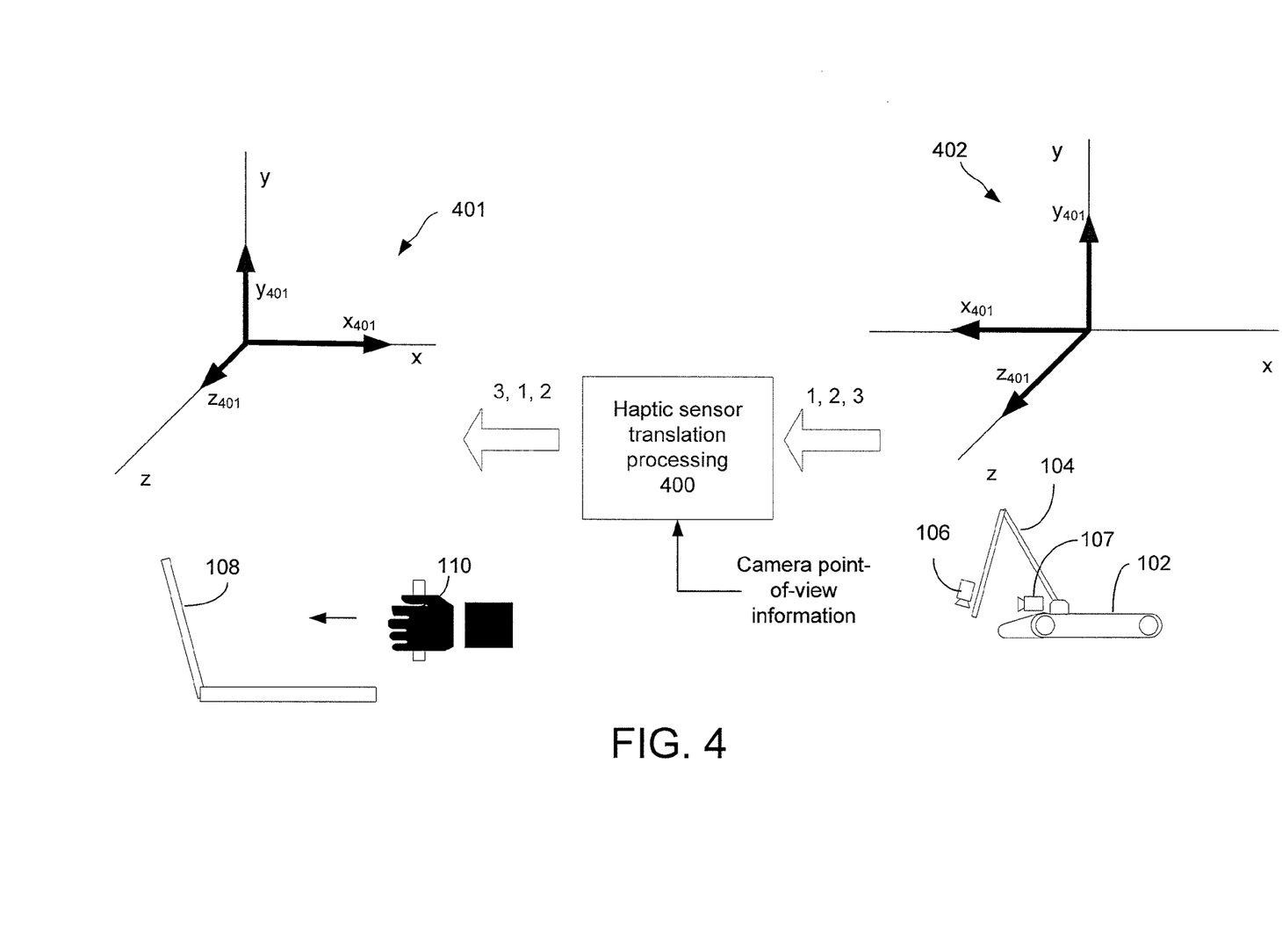
FIG. 4 is a conceptual drawing that is useful for understanding haptic sensor translation processing.

Referring now to FIG. 4, there is shown a conceptual drawing that is similar to FIG. 3. In FIG. 4, sensors in the robotic arm 104 will generate feedback signals that can be used to control haptic technology associated with the hand controller 110. For example such feedback signals can result in a force being applied to the hand controller 110 by one or more actuators (not shown). However, if the force is applied by the haptic technology to the hand controller 110 without regard for the variable operator frame of reference discussed above, then such haptic response can be confusing to the operator. More particularly, such haptic forces can appear to have little or no relation to the scene that the operator observes on display unit 108.

For the purposes of FIG. 4, it can be assumed that the coordinate systems 401, 402 are fixed with respect to the world. It can also be assumed that image sensor 106 is the source for images displayed on display unit 108, and the point of view of image sensor 106 thereby defines the frame of reference for the user. In FIG. 4, the signals obtained from sensors in the robot arm indicate that the distal end of robot arm 104 experiences resistance to movement in a defined direction. This resistance is represented in FIG. 4 by the vector component forces show in coordinate system 402. For simplicity in understanding the invention, rotational forces are not shown in coordinate system 402; however, it should be understood that the forces measured by sensors in the robot arm can also include such rotational force components.

The component vector forces in coordinate system 402 are defined along the x, y, and z axis which together represent a frame of reference at the UGV 102. Still, the operator may have a frame of reference that is different as compared to a frame of reference of the UGV 102. As explained above, the operator's frame of reference will often change as the position and orientation of a imaging sensor 106 is varied. Likewise, the operator's frame of reference will vary depending on whether the operator is observing a video output from imaging sensor 106 as compared to imaging sensor 107. Accordingly, if the vector forces in coordinate system 402 are to be meaningful to a user or operator in an interface where haptic technology is used, such forces must be translated. Specifically, the vector components in coordinate system 402 must be translated from the frame of reference of the UGV 102, to the operator's frame of reference as determined by the point-of-view of the imaging sensor (imaging sensor 106 in this example). This modification is advantageously performed by haptic sensor translation processing 400.

Referring to the example in FIG. 4, the vector components $x_{402}$, $y_{402}$, $z_{402}$ are translated by haptic sensor translation processing 400 to vector components $x_{401}$, $y_{401}$, $z_{401}$ as shown in coordinate system 401. This translation function is performed based on input received from the UGV 102 relating to imaging sensor point-of-view information. Following such translation, the direction of force applied by the haptic technology at hand controller 110 can appear to have little relation to the actual direction of forces applied to the distal end of robot arm 104. However, these haptic forces will be meaningful to the operator because they have been translated to the operator's frame of reference as defined by the point-of-view of the imaging sensor through which he is observing the operation of the robotic arm. Notably, the actual translation performed by haptic sensor translation processing 400 will not be a static function since the point-of-view associated with imaging sensor 106, 107 may be constantly changing. A different translation will be performed when the imaging sensor is moved from a first point-of-view to a second point-of-view.

Those skilled in the art will appreciate that the examples shown in FIGS. 3 and 4 have been greatly simplified for ease of understanding the invention. In practice, input signals from multiple sensors can be evaluated for purposes of determining the direction and magnitude of position displacement experienced by the hand controller 110. Similarly, multiple sensors can be used to determine resistance or other forces experienced by the robot arm 104. Also, the translation process described herein can be performed with respect to rotational control commands generated by the user interface and with respect to the rotational forces experienced by the robot arm.

Finally, the vector representation diagrams in FIGS. 3 and 4 are provided for purposes of conceptually illustrating the inventive systems and methods; but it should be understood that the invention is not limited in this regard. In some embodiments, the data representing position displacement or applied forces which are to be translated can consist partially or entirely of raw or processed sensor output signal data in any format. As will be appreciated by one skilled in the art, such displacement or force data can be represented in any convenient form.

Figure 5:
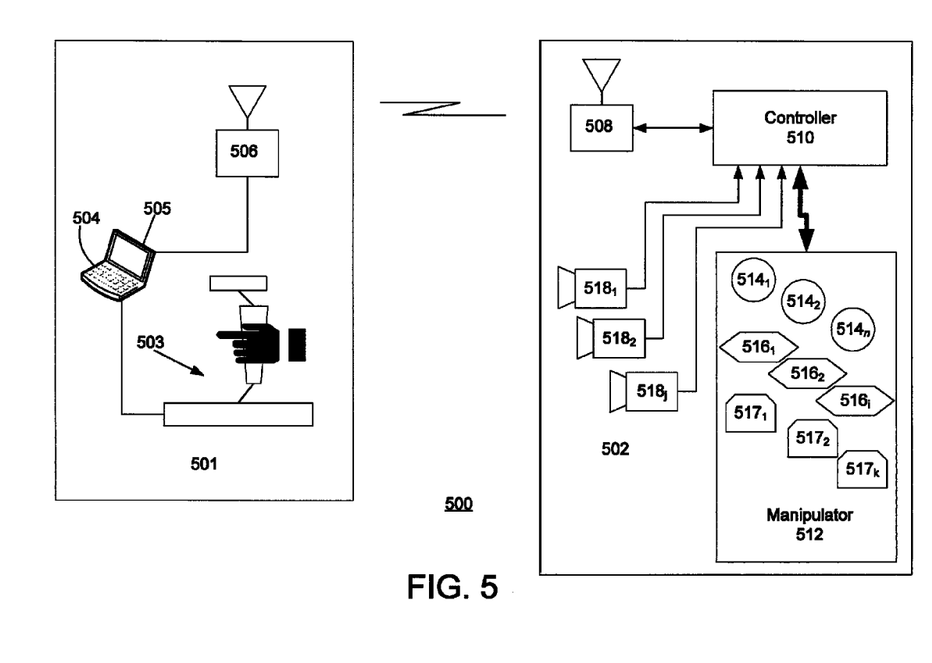
FIG. 5 is a block diagram showing a robot control system and an associated robot slave unit that is useful for understanding the invention.

Referring now to FIG. 5, there is provided a simplified block diagram showing a robotic system 500 that includes a robot control system 501 and a robot 502. A data communication link is provided between the control system 501 and robot 502. The data communication system allows the control system 501 to communicate commands to robot 502, and allows the control system to receive feedback information from the robot 502.

The control system 501 includes an operator control interface 503, a data processing system 504, and a data link 506. In some embodiments, the operator control interface 503 can be a hand control which can be grasped by a user. In some embodiments, the hand control can detect hand movement along one, two or three orthogonal axes of linear motion and as many as three axes of rotational motion. Hand controls of this type are well known in the art. For example, six-axis hand controls for sensing motion along six different directions are described in U.S. Pat. No. 6,104,158. The hand control can have one or more sensors (not shown) for detecting movement of the hand control as effected by the user. Still, it should be understood that the invention is not limited to any particular type of operator control interface 503. Instead, any user interface device that is known in the art now or in the future can be used, provided that such user interface device is capable of generating output signals in response to user input commands for purposes of remotely controlling a robotic device.

Data processing system 504 and data link 506 will be described in further detail in relation to FIG. 6. However, it should be noted that in some embodiments, data processing system 504 can include a portable computer programmed with a set of instructions. The data processing system 504 can have an integrated display unit 505 as shown for purposes of displaying video images. However, the invention is not limited in this regard, and a separate display unit (not shown) can also be used with the data processing system. Data link 506 can be any type of wired or wireless transceiver suitable for communicating data to and from data link 508 provided in robot 502. Such data can include commands directed to robot 502, feedback data communicated from robot 502 to the data processing system 504, and video data communicated from the robot 502, to the data processing system 504.

Robot 502 can be any type of remotely controlled slave device or robot system capable of performing moving, manipulating or grasping actions based on telematic commands received from control system 501. Robot 502 includes an on-board controller 510. The on-board controller 510 is in communication with data link 508, which can provide communication capabilities similar to those described herein with regard to data link 506.

In some embodiments of the invention, the robot 502 includes a remotely controlled manipulator 512 including a robot arm with one or more mechanical joints. The manipulator 512 is shown in more detail in FIG. 8. The robot arm 512 can also include a grasping device 519. The manipulator 512 can include one or more servos $514_1, 514_2, \ldots 514_n$ or other suitable motivating devices for moving one or more mechanical joints of the manipulator. The servos are controlled by commands communicated to the robot 502 by control system 501.

The feedback information communicated from robot 502 to control system 501 can include position information with regard to the one or more movable joints of the manipulator 512. The position information can be provided by one or more sensors $516_1, 516_2, \ldots 516_i$. In some embodiments, imaging sensors $518_1, 518_2, \ldots 518_j$ can be mounted to movable portions of the manipulator 512. Sensors $517_1, 517_2, \ldots 517_k$ can be provided for detecting forces exerted upon the manipulator 512. For example, sensors $517_1, 517_2, \ldots 517_k$ can detect forces exerted upon the robot arm 512 and associated grasping device. The data from sensors $516_1, 516_2, \ldots 516_i$ and $517_1, 517_2, \ldots 517_k$ is communicated to the on-board controller 510, which performs any necessary data formatting before communicating the data to data link 508. The information is then communicated by data link 508 to the control system 501.

Imaging sensor point-of-view information can be generated by any suitable means presently known in the art, or known in the future. In general, imaging sensor point-of-view information will include a position of a imaging sensor and/or its orientation. Position information can be fixed if the imaging sensor is mounted to a fixed point on the robot 502. However, the imaging sensor can also be attached to a position that is movable relative to the chassis of the robot. For example, one or more imaging sensors $518_1, 518_2, \ldots 518_j$ can be attached to a portion of a movable robot arm as shown in FIGS. 3 and 4.

The position information for the imaging sensor can be determined based on information obtained from sensors $516_1, 516_2, \ldots 516_i$ provided at one or more movable joints associated with the robot arm. The orientation of the imaging sensor can also be obtained using one or more sensors $516_1, 516_2, \ldots 516_i$ mounted within or near the imaging sensor. Such sensors can detect a imaging sensor orientation with respect to one, two or three defined coordinate axes of rotation. In a preferred embodiment, the imaging sensor position and orientation can be determined based on information obtained from sensors provided at one or more movable joints associated with the robot arm.

The methods used to perform the translation processing will vary depending on the particular system. Still, a brief discussion is provided to explain one possible way that the translation processing could be performed.

Figure 6:
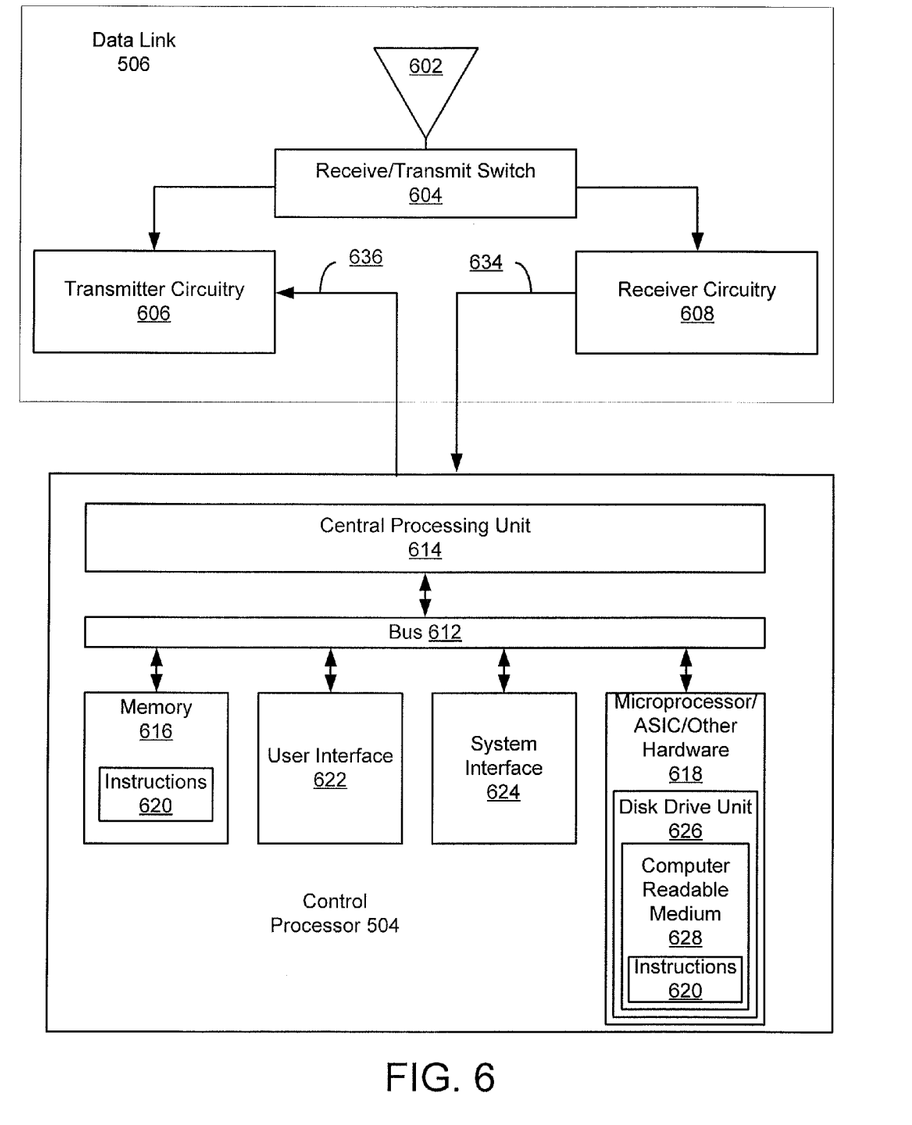
FIG. 6 is a block diagram showing the control processor and data link in FIG. 5 in greater detail.

Referring now to FIG. 6, there is provided a detailed block diagram of the data link 506 of FIG. 5. Notably, the data link 506 may include more or less components than those shown in FIG. 6. However, the components shown are sufficient to disclose an illustrative embodiment implementing the present invention. The hardware architecture of FIG. 6 represents one embodiment of a representative data link configured to permit bi-directional data communication.

As shown in FIG. 6, the data link 506 comprises an antenna 602 for receiving and transmitting Radio Frequency (RF)

signals. A receive/transmit (Rx/Tx) switch 604 selectively couples the antenna 602 to the transmitter circuitry 606 and receiver circuitry 608 in a manner familiar to those skilled in the art. The receiver circuitry 608 decodes the RF signals received from a communication device (e.g., the communication device 508 of FIG. 5) to derive information therefrom. The receiver circuitry 608 is coupled to control processor 504 via an electrical connection 634. The receiver circuitry 608 provides decoded RF signal information to the control processor 504. The control processor 504 uses the decoded RF signal information in accordance with the function(s) of the invention as described herein.

The control processor 504 also provides information to the transmitter circuitry 606 for encoding information and/or modulating information into RF signals. Accordingly, the control processor 504 is coupled to the transmitter circuitry 606 via an electrical connection 636. The transmitter circuitry 606 communicates the RF signals to the antenna 602 for transmission to communication device 508 of FIG. 5).

As shown in FIG. 6, the control processor 504 comprises a system interface 624, a user interface 622, a Central Processing Unit (CPU) 614, a system bus 612, a memory 616 connected to and accessible by other portions of the control processor 504 through system bus 612, and hardware entities 618 connected to system bus 612. System interface 624 allows the control processor 504 to communicate directly with data link 506, network equipment and other data links via a wired communications link. At least some of the hardware entities 618 perform actions involving access to and use of memory 616, which may be a random access memory (RAM), a disk drive, and/or a compact disc read only memory (CD-ROM).

Hardware entities 618 may include microprocessors, application specific integrated circuits (ASICs) and other hardware. Hardware entities 618 may include a microprocessor programmed for facilitating the provision of data communication services and robot control processing as described herein. In this regard, it should be understood that the microprocessor can access and run robot control processing including directional translation processing as described in FIGS. 3-4, and 7. The communication operations can include, but are not limited to, signal receiving operations, signal processing operations, signal generation operations, and signal communication operations.

As shown in FIG. 6, the hardware entities 618 can include a disk drive unit 626 comprising a computer-readable storage medium 628 on which is stored one or more sets of instructions 620 (e.g., software code) configured to implement one or more of the methodologies, procedures, or functions described herein. The instructions 620 can also reside, completely or at least partially, within the memory 616 and/or within the CPU 614 during execution thereof by the data link 506. The memory 616 and the CPU 614 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution that cause the control processor 504 to perform any one or more of the methodologies of the present disclosure.

As evident from the above discussion, the control processor 504 implements one or more method embodiments of the present invention. Exemplary method embodiments of the present invention will now be described in relation to FIG. 7.

Figure 7:
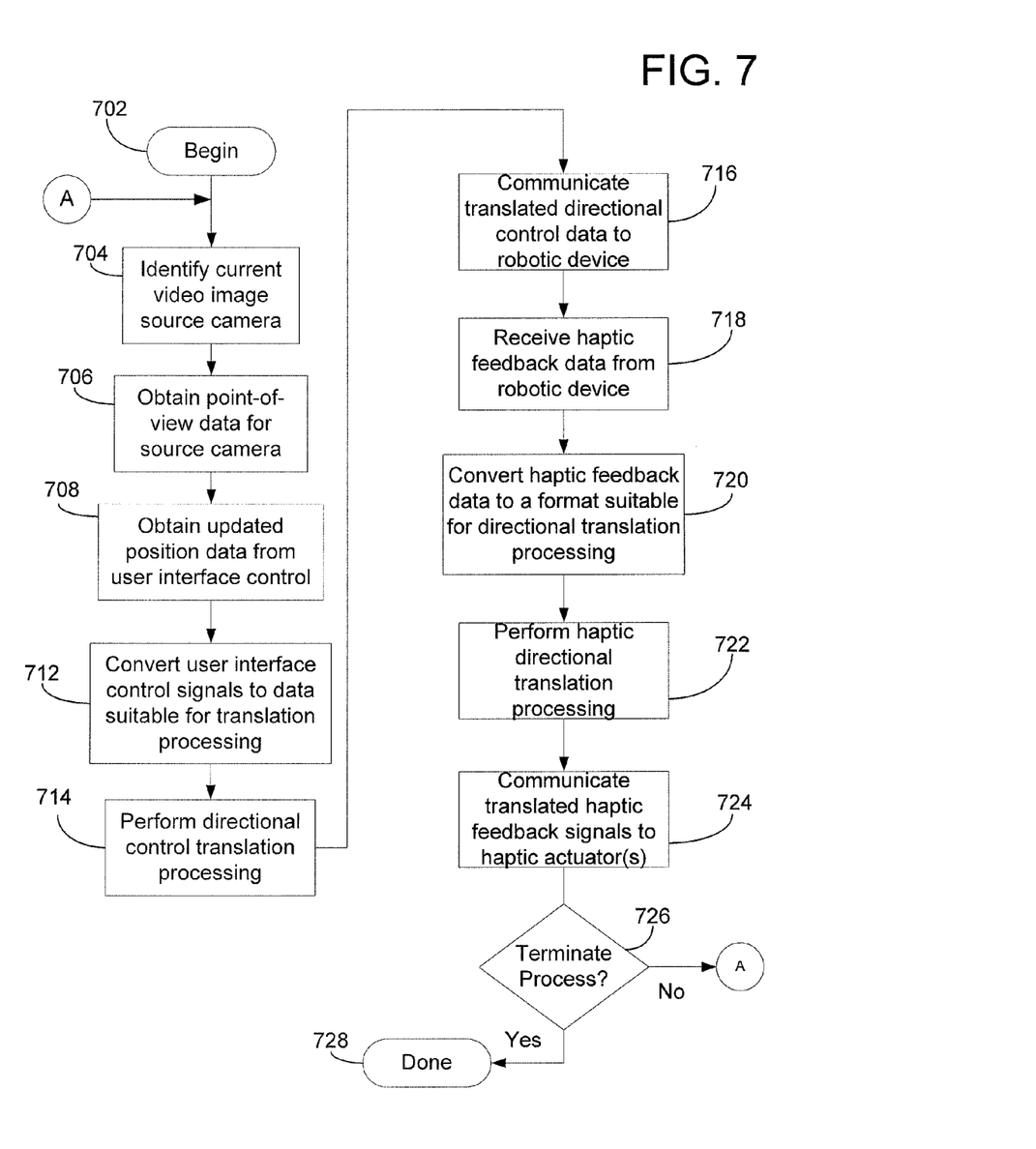
FIG. 7 is a flowchart that is useful for understanding the invention.

Referring now to FIG. 7, there is provided a flow chart that is useful for understanding a processing method for implementing the present invention. The processing method can begin in step 702 and continues with step 704. In 704, a current video image source imaging sensor is determined.

Point-of-view data for the source imaging sensor is determined at 706. Such point-of-view data can include a position and an orientation of the source imaging sensor. For imaging sensors on a stationary mount, the position information will generally be fixed. However, if the source imaging sensor is mounted on a movable structure, such as on a portion of a robot arm, then the position information can change as the position of the robot arm is changed. Imaging sensor orientation can be defined in any suitable way. The source imaging sensor orientation can be represented as a set of vectors with respect to a set of three-dimensional coordinate axes, as a set of sensor output data, or in any other convenient manner. For example, in some embodiments, the orientation can be defined in terms of a imaging sensor rotation around three orthogonal axes so as to define imaging sensor pitch, yaw, and roll. Yaw, pitch and roll in such case would represent rotations around the y-axis (yaw), around the x-axis (pitch) and around the z-axis (roll). Still, the invention is not limited in this regard.

Updated user interface control position data is obtained at 708. Such data can represent a position of a user interface control which results from a user input. For example, such data can represent a position of a six-axis hand control that is capable of sensing movement in six different directions (e.g., up, down, left, right, forward, backward). The user interface control position for purposes of the present invention can vary in three dimensions. The control position allows a user to identify a direction of desired movement to be performed by a slave device, such as a robot manipulator arm.

Following step 708, the process continues with 712, where user interface control signals are optionally converted to data suitable for translation processing in step 712. This step can be omitted if the user interface control signals are already in a suitable form for directional control translation processing.

At 714, directional control translation processing is performed to translate the control direction defined by the user interface control, to a slave direction defining a direction that a robot slave device will move. The directional control translation can include translation of linear motion commands and rotational motion commands. In order to perform such directional control translation, the process will rely upon information relating to the point-of-view of the source imaging sensor. The slave direction will generally be different from the control direction. However, the resulting slave direction will vary depending on imaging sensor point-of-view. In other words, the directional control translation will vary dynamically in response to the imaging sensor point-of-view.

The directional control data is communicated to a robotic slave device in step 716. Note that the directional translation can be performed before or after the directional control data is communicated to the robot device. In this regard it should be understood that the directional control translation processing can be performed by a processor located at a control point (near the user), or at a remote location associated with the robot (e.g. at an onboard processor provided with the robot).

In step 718, haptic feedback data is obtained from the robotic slave device. The haptic feedback data can include any information which is used to cause a force, vibration or other tactile feedback signal to be reproduced at a user interface control. The haptic feedback data can include data derived from force or pressure sensors at the robot slave unit, its associated manipulator arm, or its grasping device. Still, the invention is not limited in this regard, and any other suitable data can be used for this purpose.

In step 720 the process continues by converting haptic feedback data to a format suitable for directional translation processing. This is an optional step, and in some embodiments it may not be necessary if the haptic feedback data is already in a suitable format for directional translation processing. Thereafter, haptic directional translation processing is performed at 722. This directional translation processing is similar to the directional control translation processing in step 714. The haptic directional translation processing uses imaging sensor point-of-view information to determine a haptic feedback direction. The haptic feedback direction is the direction of a force (linear and/or rotational) applied by the user interface to provide a user with tactile feedback from the robot device. The directional translation performed by the process at this step will change depending on imaging sensor point-of-view information. Thereafter, the haptic feedback signals are communicated to one or more haptic actuator devices associated with the user interface control in step 724.

A determination is made at 726 as to whether the process should be terminated, for example in response to a user input. If so, [726: YES] then the process terminates at 728. If the process is not to be terminated [726: NO], then the process returns to step 704.

Note that in some embodiments, directional control translation can be performed without haptic feedback and/or without haptic directional translation processing. In other embodiments of the invention, haptic feedback and haptic directional translation processing can be performed without directional control translation processing. Accordingly, the invention is not limited to systems which perform both types of processing.

The directional translation performed for motion control (714) and haptic feedback (722) can be performed using any suitable method. In this regard, it should be understood that the invention is not limited to any particular mathematical or computational processing. All that is needed is a combination of sensor inputs and processing sufficient to transform motion control commands and/or haptic feedback signals as previously described. Notwithstanding the foregoing, one possible technique for performing the necessary directional translation processing shall hereinafter be described.

Figure 8:
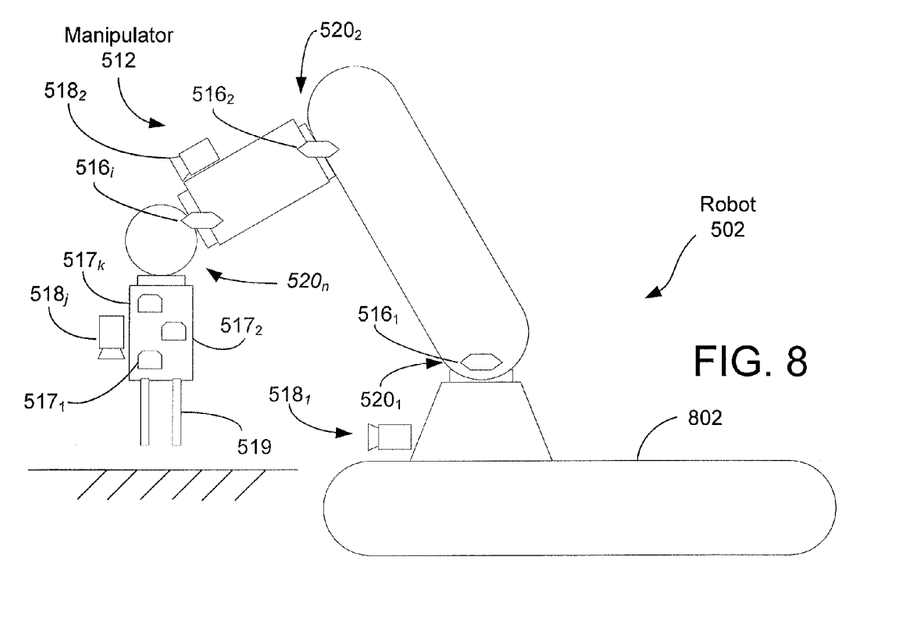
FIG. 8 is a drawing of a manipulator arm that is useful for understanding the invention.

As an example, consider the case of a manipulator arm such as the one shown in FIG. 8 that has n joints ($520_1$, $520_2$, ... $520_n$) and an arbitrary number of cameras ($518_1$, $518_2$, ... $518_j$). Let an arbitrary camera $518_c$ be attached to a link of the manipulator and let there be m joints of the robot arm that are between the camera and the base 802 of the robot 502. In other words, all joints 1 through m can potentially cause motion of the camera, while joints m+1 through n cannot, as they are located at distal points on the manipulator that extend beyond the location of the camera $518_c$. For each joint i ($1 \leq i \leq m$) we can define a 3×3 rotation matrix $R_i$ that defines the relative orientation of link i with respect to the vehicle. In general each $R_i$ is a function of the displacement of joint i. Then we define a 3×3 rotation matrix $R_{c/link}$ which defines the relative orientation of the camera coordinate frame (i.e. the camera point of view) with respect to the link it is attached to. Let the velocity of the user's hand be $v_{hand}$ and the velocity of the grasping device 519 of the robot be $v_{robot}$:

$$v_{hand} = \begin{pmatrix} \dot{x} \\ \dot{y} \\ \dot{z} \\ \omega_x \\ \omega_y \\ \omega_z \end{pmatrix} \quad v_{robot} = \begin{pmatrix} \dot{x} \\ \dot{y} \\ \dot{z} \\ \omega_x \\ \omega_y \\ \omega_z \end{pmatrix} \quad (1)$$

where $\dot{x}, \dot{y},$ and $\dot{z}$ are linear velocities along the global x, y, and z axes, respectively, and $\omega_x, \omega_y,$ and $\omega_z$ are angular velocities about the global x, y, and z axes, respectively. Similarly, let the haptic force and torque exerted on the user's hand (by the user interface 110) be $F_{hand}$ and the force and torque exerted on the grasping device 519 of the robot (by the environment) be $F_{robot}$:

$$F_{hand} = \begin{pmatrix} F_x \\ F_y \\ F_z \\ \tau_x \\ \tau_y \\ \tau_z \end{pmatrix}_{hand} \quad F_{robot} = \begin{pmatrix} F_x \\ F_y \\ F_z \\ \tau_x \\ \tau_y \\ \tau_z \end{pmatrix}_{robot} \quad (2)$$

where $F_x, F_y,$ and $F_z$ are forces along the global x, y, and z axes, respectively, and $\tau_x, \tau_y,$ and $\tau_z$ are torques about the global x, y, and z axes, respectively. Then the translation of $v_{hand}$ to $V_{robot}$ for camera c is:

$$R_{c/link} \cdot R_m \cdot \ldots \cdot R_2 \cdot R_1 = R_{c,motion} \quad (3)$$

$$v_{robot} = \begin{bmatrix} R_{c,motion} & 0_{3 \times 3} \\ 0_{3 \times 3} & R_{c,motion} \end{bmatrix} \cdot v_{hand} \quad (4)$$

Where $0_{3 \times 3}$ is a 3×3 matrix of zeros. The translation of $F_{robot}$ to $F_{hand}$ for camera c is:

$$R_{c,FT} = R_{c,motion}^T \quad (5)$$

$$F_{hand} = \begin{bmatrix} R_{c,FT} & 0_{3 \times 3} \\ 0_{3 \times 3} & R_{c,FT} \end{bmatrix} \cdot F_{robot} \quad (6)$$

It should be appreciated that while embodiments of the invention have been described in terms of a robot slave device such as a UGV and a robotic manipulator arm, the invention is not intended to be so limited. Instead, the remotely controlled slave device can include any type of device, provided that such device is capable of being remotely controlled by an operator through the use of telematic systems. As used herein, the phrase telematic system can include any technology capable of sending, receiving, and storing information via telecommunication devices in conjunction with effecting control on remote objects.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for providing haptic feedback to a user at a user interface device when the user interface device is operated to control a slave device, comprising:

using at least one sensor disposed on the slave device to sense a force applied to the slave device in a sensed direction defined with respect to a first three-dimensional set of coordinate axes associated with the slave device, and using said at least one sensor to generate a signal representing the force;

using a computer processor device to perform a directional translation to convert data specifying said sensed direction to data specifying a haptic feedback direction defined with respect to a second three-dimensional set of coordinate axes associated with a user interface control, said haptic feedback direction different from said sensed direction and defining a direction of force to be generated by at least one component of said user interface;

wherein said directional translation comprises performing a mathematical operation to determine a force $F_{hand}$ to be exerted by the user interface control upon a user's hand based on a force $F_{robot}$ exerted on a the slave device and a relative orientation of a first imaging sensor with respect to the chassis of said slave device.

2. The method according to claim 1, wherein said sensed direction of said force comprises one or more of a linear sensed direction and a rotational sensed direction with respect to said first three-dimensional set of coordinate axes.

3. The method according to claim 2, wherein said haptic feedback direction comprises one or more of a linear haptic direction and a rotational haptic direction with respect to said second three-dimensional set of coordinate axes.

4. The method according to claim 3, wherein said directional translation comprises one or more of a linear translation and a rotational translation.

5. The method according to claim 1, further comprising using said computer processor device to automatically dynamically modify said directional translation that is performed when a point-of-view determined by the relative orientation of the first imaging sensor is modified.

6. The method according to claim 5, further comprising determining said point-of-view based on a sensed position of one or more movable joints comprising said slave unit.

7. The method according to claim 5, further comprising using the computer processor device to automatically dynamically modify said directional translation in response to a user selection of an image obtained from a second imaging sensor, where said second imaging sensor has a different point-of-view as compared to said first imaging sensor.

8. The method according to claim 1, further comprising communicating data representing at least one of said sensed direction and said haptic feedback direction to said user interface to generate a force using at least one component of said user interface.

9. A robot system, comprising:

at least one sensor disposed on a slave device which senses a force applied to the slave device in a sensed direction defined with respect to a first three-dimensional set of coordinate axes associated with the slave device;

the slave device responsive to control signals generated by a user interface control to control at least one movement of the slave device when the user interface control is manipulated by a user;

a communication link for communicating motion control information from said user control interface to said slave device;

a control processor device which receives information concerning the sensed direction and performs a directional translation to convert data specifying said sensed direction to data specifying a haptic feedback direction defined with respect to a second three-dimensional set of coordinate axes associated with a user interface control, said haptic feedback direction different from said sensed direction and defining a direction of force to be generated by at least one component of said user interface control;

wherein said directional translation comprises performing a mathematical operation to determines a force $F_{hand}$ to be exerted by the user interface control upon a user's hand based on a force $F_{robot}$ exerted on the slave device and a relative orientation of a first imaging sensor with respect to the chassis of said slave device.

10. The robot system according to claim 9, wherein said sensed direction comprises one or more of a linear sensed direction and a rotational sensed direction with respect to said first three-dimensional set of coordinate axes.

11. The robot system according to claim 10, wherein said haptic feedback direction comprises one or more of a linear haptic direction and a rotational haptic direction with respect to said second three-dimensional set of coordinate axes.

12. The robot system according to claim 11, wherein said directional translation comprises one or more of a linear translation and a rotational translation.

13. The robot system according to claim 9, wherein said control processor device automatically dynamically modifies said directional translation that is performed when a point-of-view of said first imaging sensor is modified by changing its relative orientation.

14. The robot system according to claim 13, wherein said control processor device determines said point-of-view based on a sensed position of one or more movable joints comprising said slave unit.

15. The robot system according to claim 9, wherein a first point-of-view of said first imaging sensor is determined by at least one of a location and an orientation of the first imaging sensor, and wherein said control processor device automatically dynamically modifies said directional translation in response to a user input selection of an image obtained from a second imaging sensor in place of said first imaging sensor, where said second imaging sensor has a second point-of-view different as compared to said first imaging sensor.

* * * * *